United States Patent Office 3,316,916
Patented May 2, 1967

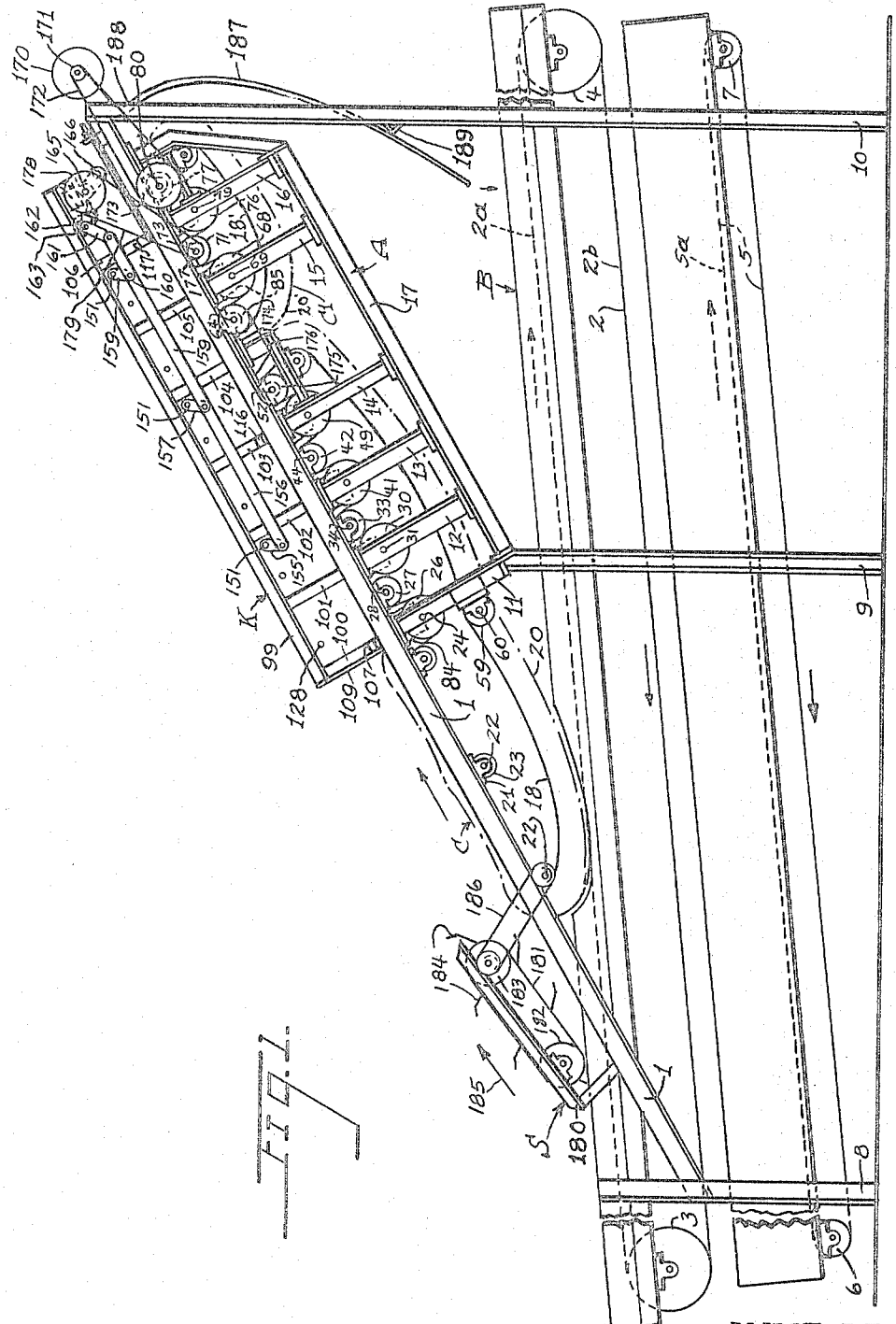

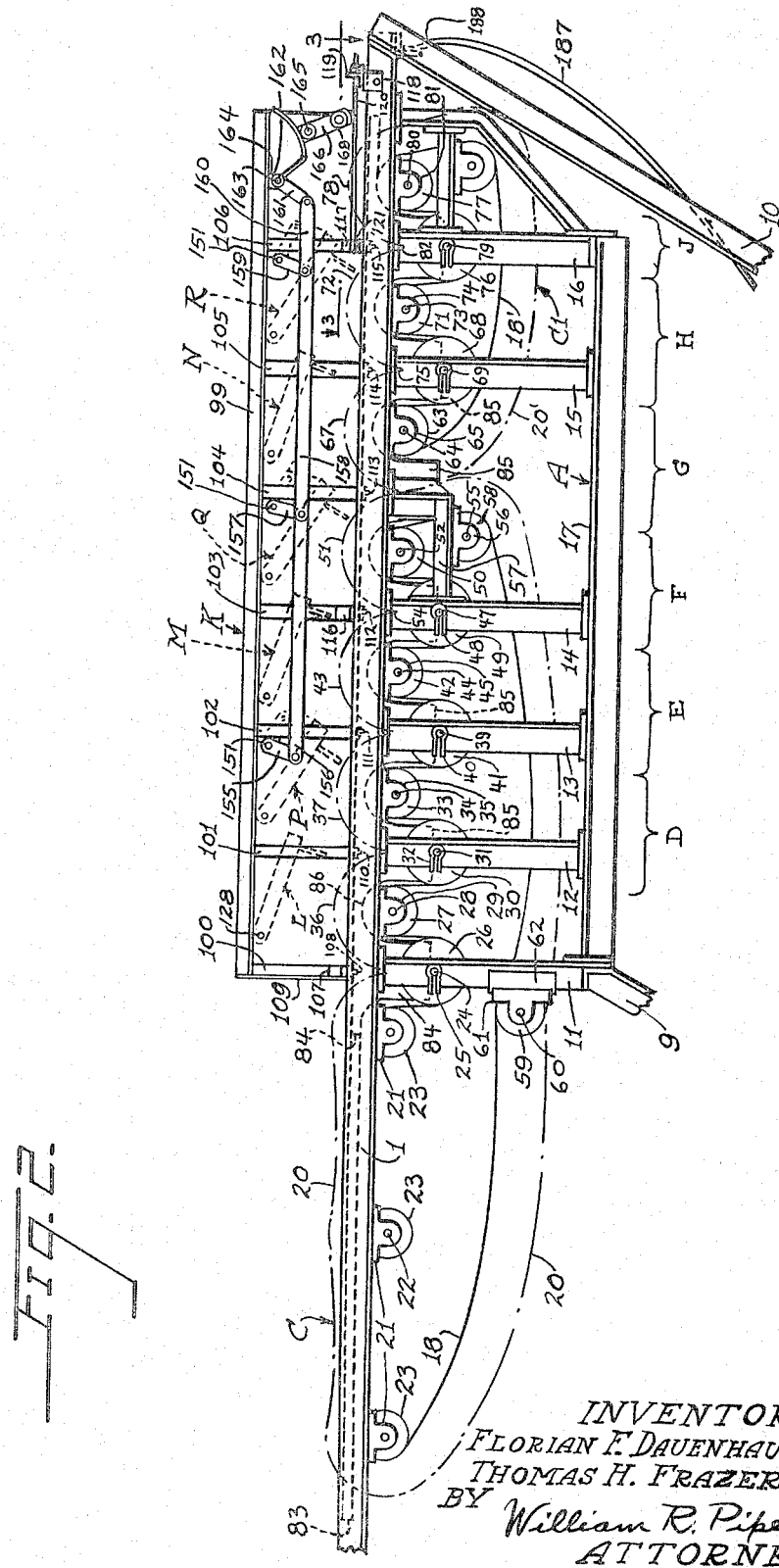

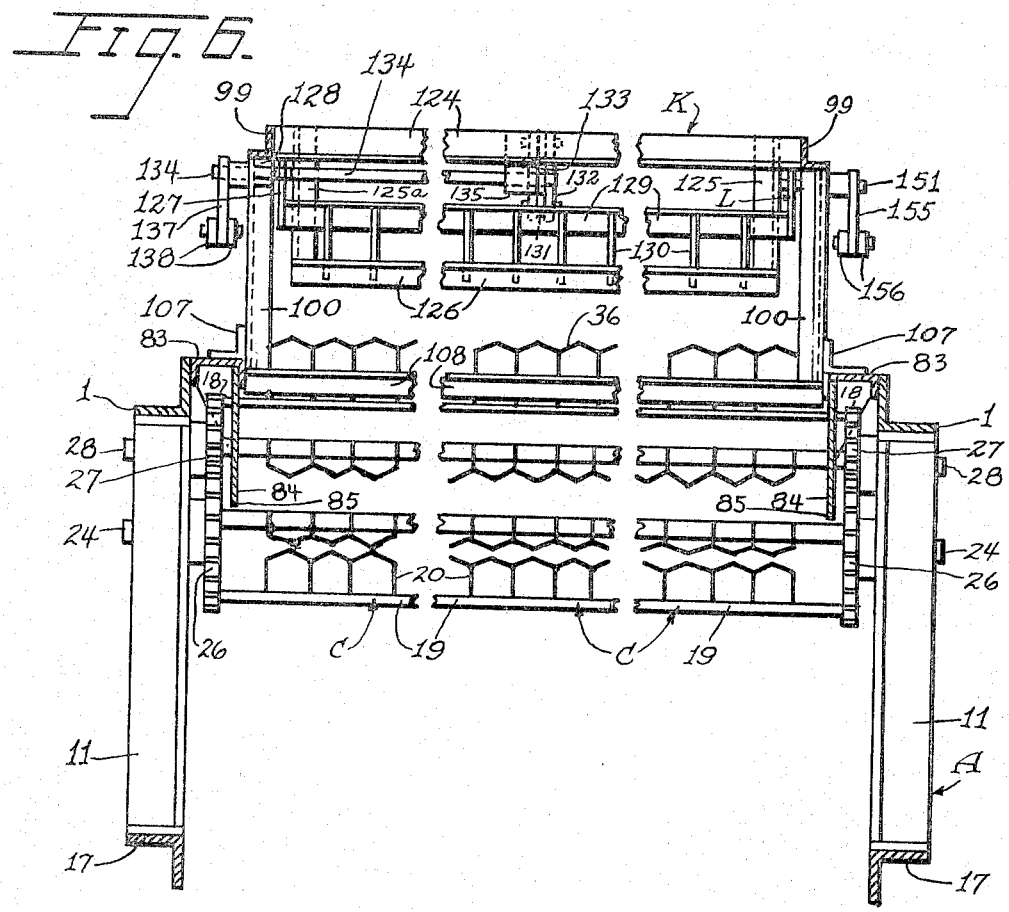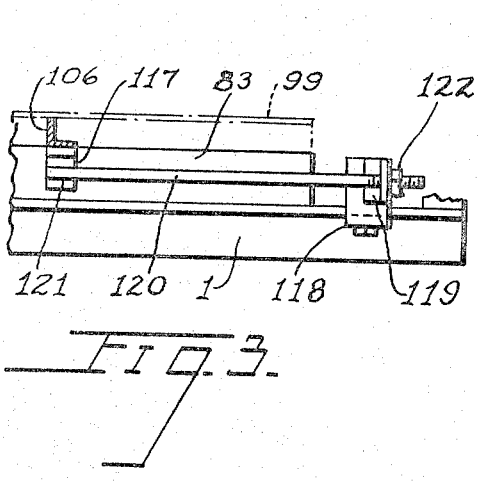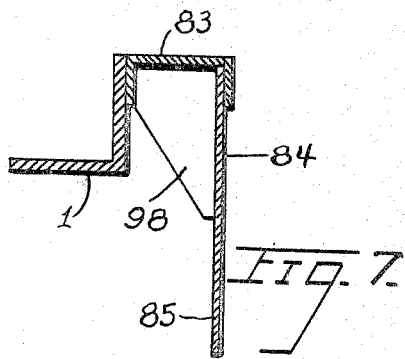

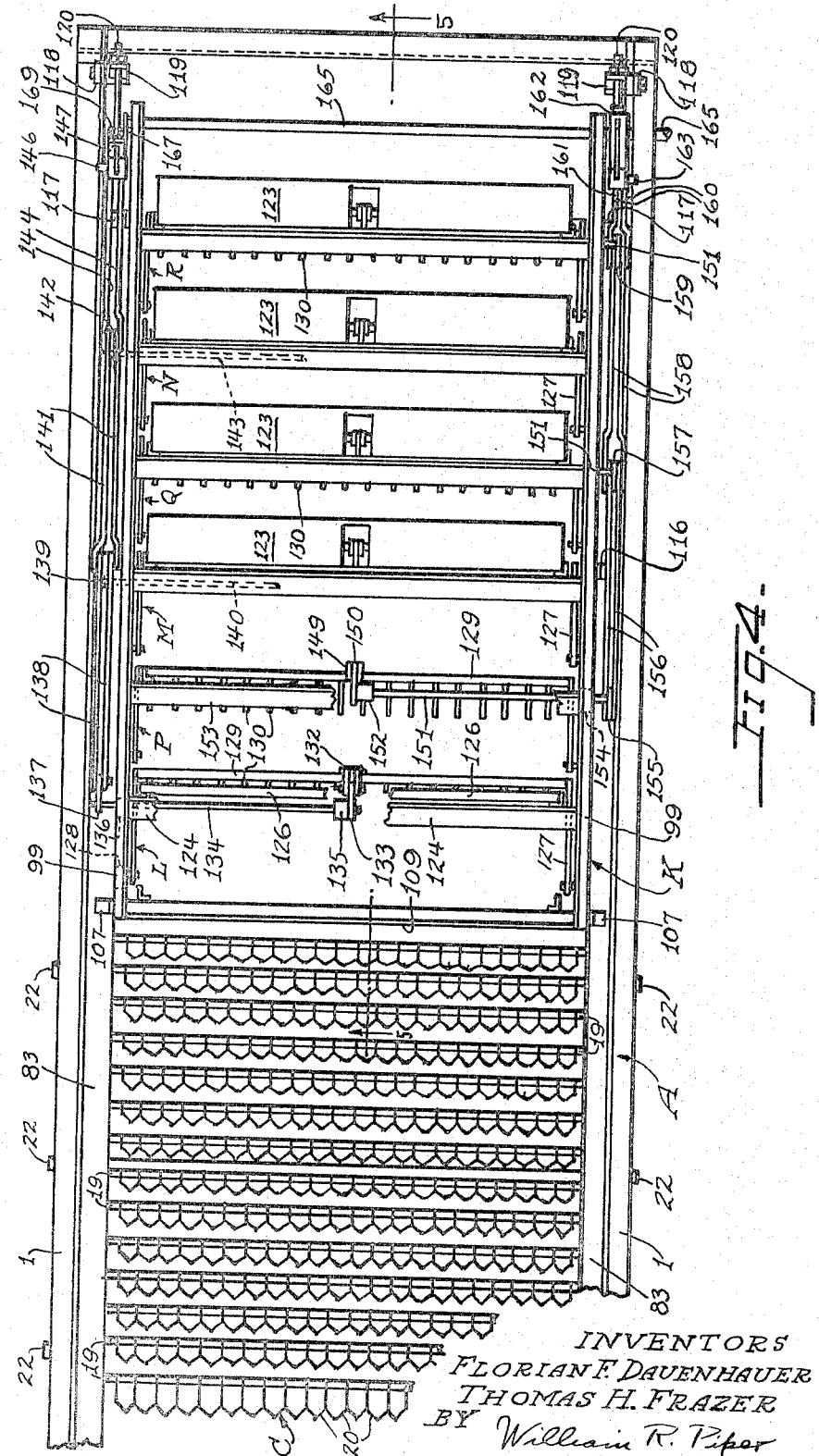

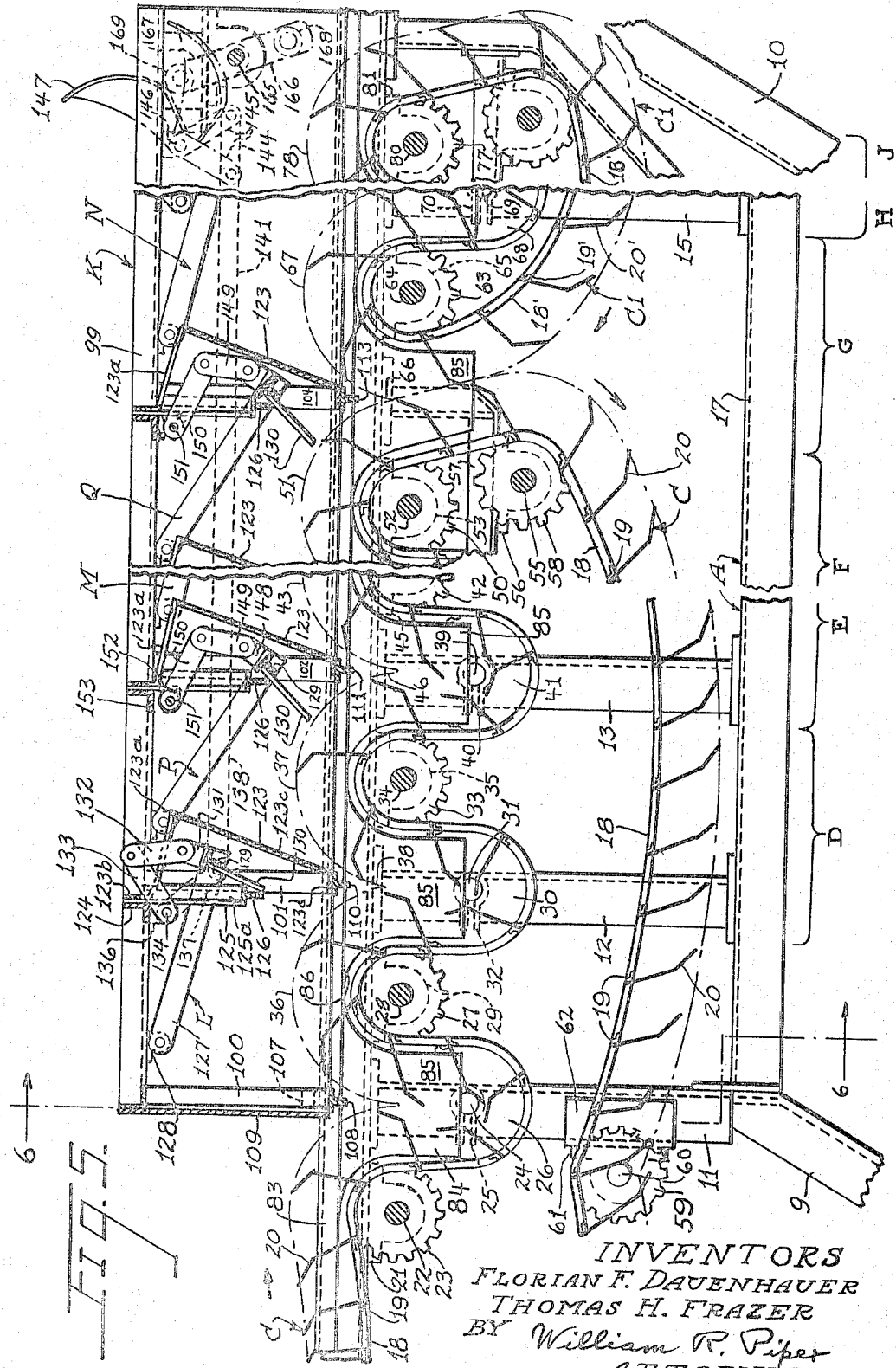

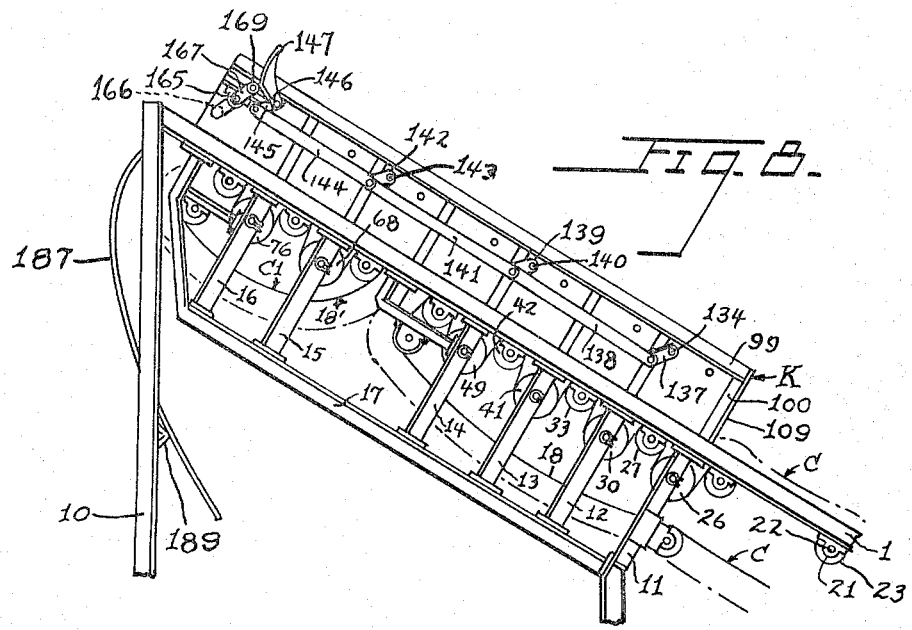
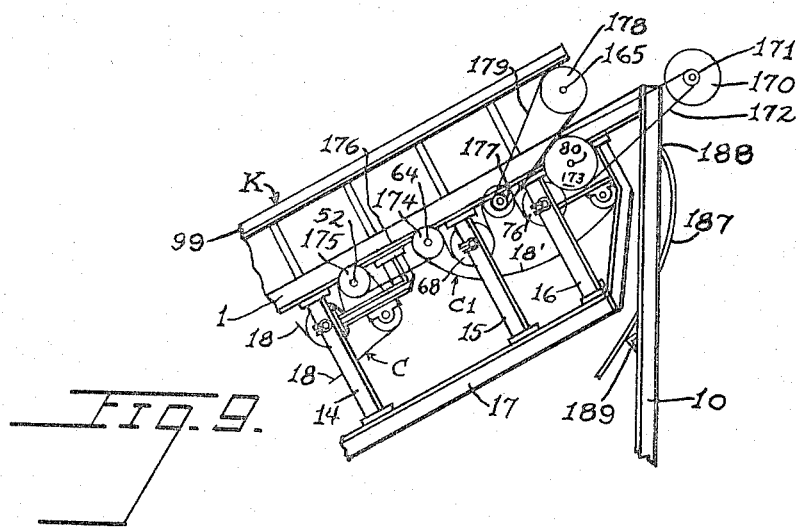

3,316,916
HOP PICKING MACHINE
Florian F. Dauenhauer and Thomas H. Frazer, both of 111–121 5th St., Santa Rosa, Calif. 95401
Filed May 22, 1964, Ser. No. 369,392
16 Claims. (Cl. 130—30)

The present invention relates to improvements in a hop picking machine, and it consists in the combination, construction and arrangement of parts as hereinafter described and claimed.

An object of our invention is to provide a hop picking machine which is an improvement over the device disclosed in the United States Patent No. 2,681,066, of Florian F. Dauenhauer on an apparatus for picking hops from hop branches and clusters and for separating leaves and stems therefrom, this patent being issued on June 15, 1954. In the patented device a combined hop picker and endless conveyor moved the hop branches along the length of the machine in an undulating path consisting of a series of crests and valleys that extended transversely across the width of the conveyor. In each valley a branch retarding pair of combs were placed and the tines of both combs lay in a single plane that paralleled the length of the valley. The supporting structure of each pair of combs acted as a barrier and caused the hop branches to move into each valley as the conveyor moved the branches through the machine. The tines on one comb of each pair of combs alternated with the tines of the other comb and the combs in each pair were alternately raised and lowered so that first the tines of one of the pair of combs would extend into the valley to retard the movement of certain hop branches and then the tines of the other comb in the same pair would be moved downwardly into the valley to retard the movement of other hop branches while the formerly retarded hop branches would be released. During the holding of the hop branches the picking fingers on the endless conveyor would pick hops from these branches. At no time was a valley cleared of all tines on both pair of combs.

The result was that the hop branches would tend to bunch up in each valley because there was always the tines of one comb of the pair of combs retarding the movement of certain branches. The bunching of the hop branches in the valleys would tend to crush some of the hops. Also the volume of hop branches that could be fed through the machine was limited because at no time was the path through a valley entirely unobstructed.

An object of our invention is to provide a hop picking machine in which a single comb is used with each valley. This comb is raised for a predetermined time period to free the comb tines from the hop branches and permit the unobstructed flow of the branches through the valley so as to prevent the undue bunching of the branches in the valley with the resulting crushing of some of the hops. Furthermore the comb tines engage with the hop branches a predetermined distance before the branches enter the deepest part of the valley. A vine branch barrier is arranged at the deepest point in each valley for causing all of the branches to move down into the valley before they can proceed further through the machine. When the comb is moved into operative position for causing its tines to retard certain branches, these branches will have portions extending from points on the crest just in advance of the valley and these portions will extend under the vine branch barrier and up onto the next crest. The hop picking fingers on the endless conveyor that carries the vines through the machine will perform a hop-picking operation on the temporarily held vine branches throughout a far greater length of the vines than was possible with the patented machine above mentioned. More hops will therefore be picked from the vines and this is a great improvement over the patent.

There are a plurality of successive stages in the present machine where the vines are temporarily held while the hop-picking operation is carried on. Each stage includes a descending portion of a crest followed by the valley and then extends up onto the next crest. The vine-retarding combs in the valleys are arranged in two groups and alternate combs are operatively connected together and form one group while the remaining alternate combs are operatively connected together and form the second group. The means for raising the combs out of the valleys and for lowering the combs back into the valleys alternately actuates the two groups of combs so that at all times one of the groups of combs will be in their respective valleys. We show six stages in the present case and two sets of three vine-retarding combs, each with one comb for each valley although we do not wish to be confined to any particular number of stages or number of groups of combs.

Our present machine shows the vine-retarding means placed above the combined hop vine conveying and hop picking means. The machine is open on top and therefore the vines will not be crowded into a small space as they are carried over the crests that lie between adjacent valleys along which the vines are moved throughout the length of the machine.

The endless hop vine conveyor is composed of parallel endless chains interconnected by cross bars that in turn have hop-picking fingers mounted thereon. The chains are passed over a plurality of spaced apart pairs of sprockets to provide the conveyor with a plurality of spaced apart crests that are positioned along the length of the machine. The portions of the chains lying between adjacent sprockets are passed around pairs of idler sprockets that are mounted between the first mentioned pairs of sprockets and at a lower level. This provides the endless conveyor with a plurality of valleys that alternate with the plurality of crests.

The vines have a tendency to contact with the idler sprockets and to form a roll of vines in the valleys rather than continue on being moved by the endless conveyor through the machine. To overcome this we have provided vine guards at the sides of the machine that will prevent the vines from contacting with the idler sprockets. We have found from experiment that when the vines are prevented from contacting with the inner faces of the idler sprockets, the vines will not roll up into a cylindrical mass and remain in the valley. Instead of this the endless conveyor will carry the vines through the successive crests and valleys and the only time that the vines will be prevented from this continuous movement through the machine is when they become engaged by a comb in the valley which has been lowered into the valley expressly for this purpose. The vine or vines thus retarded by the lowered comb will have hops picked from them by the hop-picking fingers carried by the endless conveyor because the conveyor and fingers now move with respect to the vines which are temporarily held by the combs and the moving fingers will pick the hops. The raising of the combs will release all vines held by the comb. A stationary stripper bar cooperates with the comb in this respect and will remove all vines from the comb tines as the comb is raised.

Other objects and advantages will appear as the specification continues. The novel features of the invention will be set forth in the appended claims.

Drawings

For a better understanding of our invention, reference should be made to the accompanying drawings, forming part of this specification, in which:

FIGURE 1 is a side elevation of the hop picking machine shown on a small scale and partially diagrammatic.

FIGURE 2 is a side elevation on a larger scale of the endless conveyors and vine-retarding mechanism, portions being shown in section for greater clarity. This part of the device is shown in a horizontal plane rather than at an angle of 30° as shown in FIGURE 1. The driving mechanism for the machine is not shown in FIGURE 2.

FIGURE 3 is a horizontal section on still a larger scale of a portion of the machine illustrating how the vine-retarding mechanism can be adjusted longitudinally with respect to the endless conveyors so that the vine-retarding combs will be properly positioned with respect to the valleys provided in the conveyors. FIGURE 3 is a section taken along the line 3—3 of FIGURE 2.

FIGURE 4 is a top plan view of FIGURE 2 and is shown on the same scale as this figure. The partitions or baffles between the first and second stages and between the second and third stages are omitted in order to illustrate part of the comb operating mechanism.

FIGURE 5 is a longitudinal section taken along the line 5—5 of FIGURE 4 and is shown on a larger scale. Portions of the machine have been omitted so that the larger scale of drawing can be used.

FIGURE 6 is a transverse section through the machine and is taken along the line 6—6 of FIGURE 5.

FIGURE 7 is a transverse section through a portion of the machine and illustrates how the shields or guards for covering portions of the idler sprockets are held in position and are reinforced by gusset plates that are secured to the shields.

FIGURE 8 is a side elevation from the opposite side of the machine shown in FIGURE 1 and it includes only a portion of the hop vine loading area that is immediately in front of the machine.

FIGURE 9 is a schematic showing of the mechanism for operating the endless hop vine conveyors and for operating the vine-retarding mechanism. Certain portions of the machine have been omitted in order that the operating mechanism be clearly illustrated.

While we have shown only the preferred form of our invention, it should be understood that various changes, or modifications, may be made within the scope of the annexed claims without departing from the spirit thereof.

*Detailed description*

In carrying out our invention we show our hop picking machine generally at A and mounted on an inclined frame that includes upwardly inclined angle irons 1, see FIGURE 1. The hop-picking machine A is disposed above an endless conveyor indicated generally at B and this conveyor includes an endless screen conveyor 2 that is passed around drums 3 and 4. The upper reach 2a is disposed under the hop picking machine A and receives hops that are picked by this machine as will be described hereinafter. The endless screen conveyor 2 preferably has a two inch mesh that will permit hops to drop through the upper reach 2a and also pass through the lower reach 2b. Any foreign matter dropping from the hop picking machine onto the upper reach 2a of the endless screen conveyor 2 and which is too large to pass through the screen mesh, will be retained by the upper reach and moved to the discharge end of the conveyor B. The upper reach 2a moves to the right in FIGURE 1. Any means, not shown, may be used for operating the endless screen conveyor 2.

FIGURE 1 further shows the endless screen conveyor 2 disposed above an endless conveyor belt 5 whose upper reach 5a receives the hops that have passed through the meshes of the upper and lower reaches 2a and 2b of the conveyor 2. The endless conveyor belt 5 is passed around drums 6 and 7. The upper reach 5a moves to the right in FIGURE 1 and discharges hops from the belt 5. Any means, not shown, may be used for actuating the endless conveyor belt 5.

The inclined angle irons 1 for the hop picking machine A, the endless screen conveyor B, and the endless conveyor belt 5 are all supported by upright members 8, 9 and 10 that in turn rest on a supporting surface. The endless screen conveyor B and the endless conveyor belt 5 form no part of our present invention. We will now describe the hop picking machine A in detail.

*Hop picking machine*

The hop picking machine A is shown on a larger scale in FIGURE 2 and the supporting angle irons 1 are disposed in a horizontal plane for a better showing of the machine rather than in an inclined plane although the hop picking machine is inclined as in FIGURE 1 when it is in use. FIGURE 4 shows a top plan view of the hop picking machine A on the same scale as FIGURE 2, while FIGURE 5 is a longitudinal view of the machine on a still larger scale and is taken along the section line 5—5 of FIGURE 4. Certain portions of the machine are omitted in FIGURE 5 because they are duplicates of portions that are illustrated in FIGURES 2 and 4. A transverse section of the hop picking machine A is shown in FIGURE 6 and this is shown on the same scale as FIGURE 5. The section of FIGURE 6 is taken along the section line 6—6 of FIGURE 5.

Referring first to FIGURES 2, 4 and 6, it will be noted that the main angle irons 1 have a plurality of depending angle iron supporting members 11 to 16 inclusive extending downwardly therefrom. Each of the two main side angle irons 1 carry the same number of supporting members 11 to 16 and they are spaced along the angle irons 1 so as to form pairs of depending angle irons. The lower ends of one group of angle irons 11 to 16 inclusive depending from one side angle iron 1, support a bottom angle iron 17 and in like manner the lower ends of the other group of angle irons 11 to 16 inclusive depending from the other side main angle iron 1, support another bottom angle iron 17. The two side angle irons 1, pairs of depending angle irons 11 to 16 inclusive, and the bottom angle irons 17 form the main endless conveyor carrying frame for the hop picking machine.

This main frame supports two endless conveyors C and C1 both being used for moving hop vines from one end of the frame to the other and the upper reaches of the two conveyors are formed into a plurality of successive valleys and crests for causing the hop vines to likewise move through a succession of valleys and crests while they are carried along the length of the machine. We do not want to be confined to two endless conveyors. One or more endless conveyors could be used. We provide novel vine-retarding means for retarding the movement of the hop vines as they move downwardly from one crest, through the adjacent valley and up onto the next crest. The endless conveyors carry hop-picking fingers and while the vines are retarded in their movement by the vine-retarding means, these fingers will remove hops from the vines. The vine-retarding means will be described after the structures of the two endless conveyors have been described.

In FIGURE 2, we show the endless hop picking conveyor C. This endless conveyor C comprises a pair of endless chains 18, shown in FIGURES 2, 5 and 6. Transverse picker bars 19 have their ends carried by the endless chains 18 and the picker bars are preferably angle irons. Hop-picking fingers 20 have their ends welded or otherwise secured to the picker bars and each bar carries a row of these fingers as clearly shown in FIGURES 4 and 6. The fingers 20 have their V-shaped ends bent at an angle as shown in FIGURE 5. The hop picking fingers are illustrated by single lines because the scale is too small to show double lines. The same type of bar and finger construction is disclosed in Patent No. 2,681,066.

The angle irons 1 in FIGURE 2 are shown supporting pairs of spaced apart bearings 21 which in turn rotatably The second hop vine endless conveyor C1, see FIGURES 2 and 5, cooperates with the endless conveyor C and the upper reach of the second conveyor has crests and valleys formed therein which provide a continuation of the valley and crests formed in the upper reach of the conveyor C. The elements forming the second endless conveyor are the same as those forming the conveyor C and the same reference numerals will be given to these elements except that they will be primed.

Endless chains 18' have portions passed over a pair of sprockets 63 that are mounted on a cross shaft 64 which is rotatably carried by bearings 65 secured to the undersurfaces of the main side angle irons 1. The sprockets 63 and bearings 65 are positioned close enough to the cross shaft 52 and sprockets 50 so that the arcuate portion of the conveyor C that travels around the sprockets 50 and the arcuate portion of the conveyor C1 that travels around the sprockets 63 will form a pulley 66 between them. This valley 66 will be associated with the fourth hop picking stage and is designated by the bracket G in FIGURES 2 and 5. The hop picking means associated with the valley 66 will be described hereinafter. The portion of the endless conveyor C1, extending over the sprockets 63 will form the crest 67.

The chains 18' extend downwardly from the pair of sprockets 63 and are passed under a pair of idler sprockets 68 that have bearings, not shown, which are rotatably mounted on stub shafts 69. These stub shafts 69 are rigidly mounted in clamping portions 70 that are integral with the pair of depending angle irons 15. The chains 18' then extend upwardly and are passed over the tops of another pair of sprockets 71 to form a sixth crest 72. The sprockets 71 are mounted on a cross shaft 73 that in turn is rotatably carried by bearings 74 which are attached to the undersurface of the side angle irons 1. The axis of the cross shaft 73 lies in the same common plane that includes the axes of the cross shafts 28, 34, 44, 52 and 64. Also the common axis for the stub shafts 69 lies in the same common plane that includes the common axes for the pairs of stub shafts 24, 31, 39 and 47. The portions of the chains 18' extending downwardly from the pair of sprockets 63, under the pair of idler sprockets 68 and up to the next pair of sprockets 71, forms a valley 75 that will be associated with the fifth hop picking stage and represented by the bracketed area H in FIGURE 2.

A sixth and last hop picking stage is indicated by the bracketed portion J in FIGURE 2 and this is similar to the fifth hop picking stage H. Portions of the parallel endless chains 18' extend downwardly from the sprockets 71 and are passed under idler sprockets 76. Then the chains 18' have portions extending upwardly from the idler sprockets 76 and they are passed over the tops of a pair of sprockets 77 to form a crest 78. The idler sprockets 76 are rotatably mounted on stub shafts 79, rigidly mounted in the pair of depending angle irons 16, and the sprockets 77 are keyed to a cross shaft 80, mounted in bearings 81 supported by the main side angle irons 1. The valley 82 for the sixth hop picking stage is formed by the portion of the upper reach of the second endless conveyor C1 that extends downwardly from the sprockets 71, is passed under the idler sprockets 76 and extends upwardly to the sprockets 77.

Before describing the hop vine retarding mechanism it is best to set forth how the portions of the chains 18 and 18' for the upper reaches of the endless conveyors C and C1 are protected and how portions of the inner surfaces of the idler sprockets 26, 30, 41, 49, 68 and 76 are shielded from any hop vines contacting them. In the transverse section of FIGURE 6, we show a pair of inverted channel irons 83 that have their outer flanges welded or otherwise secured to the main side angle irons 1. The inverted channel irons 83 overlie the three pairs of sprockets 23 and also the pairs of sprockets 27, 33, 42, 50, 63, 71 and 77.

The inner flanges of the inverted channel irons 83 have a pair of shields 84 welded or otherwise secured thereto, see FIGURE 6. The shields or guards 84 have a plurality of depending portions separated by recesses as clearly shown in FIGURES 2 and 5. The depending portions 85 extend part way down over the inner surfaces of the idler sprockets 26. The idler sprockets 26, 30, 41, 49, 68 and 76 in FIGURE 2, have their peripheral teeth shown by a single circle because of the smallness of the scale for the figure. Also the endless chains 18 and 18' in the same figure are represented by a single line and the paths taken by the hop picking fingers 20 and 20' for these chains and endless conveyors C and C1 are represented by dot-dash lines.

Again referring to both FIGURES 2 and 5, the shields or guards 84 have recesses 86 disposed immediately to the right of the depending portions 85. These recesses accommodate portions of the endless chains 18 and 18' and the transverse picker bars 19 and 19' that pass over the tops of the sprockets 27, 33, 42, 50, 63, 71 and 77. One of the depending portions 85 extends downwardly along the inner side of the sub-frame 57 for a predetermined distance. The depending portions 85 are each reinforced by a gusset plate 98, see FIGURE 7. The gusset plate has a triangularly-shaped depending portion that projects below the side flanges of the channel. The longer edge of the triangle portion abuts the inner surface of the depending portion of the shield 84 and is welded or otherwise secured thereto. The top part of each gusset plate is welded to the inverted channel 83.

Hop vine retarding mechanism

We provide a hop vine retarding mechanism for temporarily stopping the movement of certain hop lines in each of the six stages D, E, F, G, H and J. The mechanism is so designed that the hop vine holding means will retain vines in stages E, G and J, see FIGURE 2, while at the same time in the other three stages D, F and H, the hop vine holding means will be held in inoperative position and will permit vines to move therethrough. Therefore the hop vines that are held from movement in the three stages E, G and J, will have hops picked therefrom by the fingers 20 and 20' on the upper reaches of the endless conveyors C and C1, while at the same time the hop vine holding means for the other three stages D, F, and H will be held in inoperative position and will permit hop vines to freely pass through these stages without being held and no hops will be picked from the vines in these stages at this time.

The hop vine retarding mechanism is so designed that after the hop vine holding means has held certain vines in the three stages E, G and J, for a predetermined time period, then the means in these stages will be moved into inoperative position to free the vines and the vine holding means for the stages D, F and H will be moved from inoperative to operative positions to hold certain vines in these last named stages while hops are picked therefrom. The mechanism is such that there will always be three hop vine holding means in operative position in their associate stages.

Hop vine retarding means

Referring to FIGURES 2, 4, 5, 6 and 8, it will be seen that we provide an upper frame indicated generally at K that carries the hop vine retarding mechanism. This frame K is adjustably supported by the tops of the inverted channels 83. The upper frame K has parallel and spaced apart angle irons 99, clearly shown in transverse section in FIGURE 6. The length of the angle irons 99 is such that they will extend throughout the length of the upper frame and be positioned above all of the crests 36, 37, 43, 51, 67, 72 and 78, provided in the upper reaches of the two endless conveyors C and C1. The top angle irons 99 have pairs of depending angle irons indicated at 100 to 106 inclusive. The front pair of angle irons 100 for carry cross shafts 22. The shafts 22 in turn have sprockets 23 mounted thereon and portions of the endless chains 18 extend over these sprockets. There are three spaced apart cross shafts 22 positions in front of the first pair of depending angle irons 11 and their sprockets 23 support a sufficient length of the hop picking conveyor C to constitute this length as a loading area for receiving hop vines as will be explained more fully hereinafter.

The first depending pair of angle irons 11 carry stub shafts 24. FIGURES 2 and 5 show the angle irons 11 as carrying integral clamps 25 that receive the stub shafts 24 and rigidly hold them in place. The stub shafts 24 rotatably carry idler sprockets 26 and these rotate on bearings, not shown, that are mounted on the stub shafts 24. The idler sprockets 26 are mounted below the common plane for the axes of the sprockets 23. FIGURE 5 shows the portions of the chains 18 lying between the right hand pair of sprockets 23 and the pair of idler sprockets 26, as extending substantially parallel to the lengths of the depending angle irons 11. The same figure shows another pair of sprockets 27, mounted on a cross shaft 28 that in turn is rotatably carried by bearings 29 supported by the main side angle irons 1. The axis of the shaft 28 lies in the same common plane as the axes of the three shafts 22. The portions of the endless chains 18 extending from the idler sprockets 26 to the pair of sprockets 27, will substantially parallel the lengths of the depending angle irons 11.

A valley is thus formed in the upper reach of the endless conveyor C between the right hand pair of sprockets 23 in FIGURE 2 and the first pair of sprockets 27 in the main frame of the hop picking machine A, see FIGURE 5. The purpose of this valley being formed in the upper reach of the endless conveyor C will be explained later. The portions of the endless chains 18 extending over the tops of the sprockets 27 will cause a crest to be formed in the conveyor C that immediately follows the valley formed by the idler sprockets 26.

The upper reach of the endless conveyor C has three additional valleys formed in it and three additional crests, see FIGURE 2, although again we do not wish to be confined to this exact number of valleys and crests in a conveyor. The valleys are disposed between the crests. A hop picking stage is formed by a valley and portions of the adjacent crests provided in the upper reach of the conveyor. Three hop picking stages are indicated by bracketed portions D, E and F, of FIGURE 2. The hop picking stage D is shown in detail in FIGURE 5, and also parts of stages E and F, are illustrated.

A second valley is formed in the upper reach of the endless conveyor C by passing portions of the endless chains 18 around the bottoms of a second pair of idler sprockets 30 rotatably mounted on stationary stub shafts 31. The stub shafts 31 are mounted in clamping portions 32 that are integral with the pair of depending angle irons 12. The common axis for the stub shafts 31 lies in a plane that includes the common axis for the stub shafts 24 and that parallels the common plane that includes the axes of the three cross shafts 22 and the cross shaft 28. Portions of the endless chains 18 are also passed over another pair of sprockets 33 that are mounted on a cross shaft 34 which in turn is rotatably carried by bearings 35 depending from the main side angle irons 1.

A first crest 36 for the upper reach of the endless conveyor C is provided by the pair of sprockets 27 and a second crest 37 is provided by the pair of sprockets 33. The valley 38 lies between these two crests and portions of these crests taken with the valley 38 form the area for the first hop-picking stage indicated by the bracketed portion D in FIGURE 5. The hop vine retarding mechanism that operates in this first stage to temporarily prevent further movement of certain vines while the fingers 20 remove hops from these held vines, will be described after the remaining five hop picking stages have been described.

FIGURE 2 shows the next hop picking stage E by the bracketed area E. A pair of stub shafts 39, see FIGURE 5, are held by clamps 40 that are integral with the pair of depending angle irons 13. Idler sprockets 41 with bearings, not shown, are rotatably mounted on these stub shafts 39 and portions of the endless chains 18 extend downwardly from the sprockets 33 to the idler sprockets 41 and are passed around the bottoms of those sprockets.

Again referring to FIGURE 2, the chains 18 then extend upwardly from the idler sprockets 41 and are passed over the tops of another pair of sprockets 42 to form a third crest 43 in the upper reach of the conveyor C. These sprockets are mounted on a cross shaft 44 that in turn is rotatably carried by bearings 45 which are attached to the undersurfaces of the side angle irons 1. The axis of the cross shaft 44 lies in the same common plane that includes the axes of the shafts 28 and 34. Also the common axis for the stub shafts 39 lies in the same common plane that includes the common axes for the pairs of stub shafts 24 and 31. The portions of the chains 18 extending downwardly from the pair of sprockets 33, under the pair of idler sprockets 41 and up to the next pair of sprockets 42 forms the transverse picker bars 19 carried by these portions into a valley 46 that will be associated with the second hop picking stage E, hereinafter described.

Also in FIGURE 2, the third hop picking stage F, is designated by the bracketed area F. A pair of stub shafts 47 are rigidly held by clamps 48 that are integral with the pair of depending angle irons 14. Idler sprockets 49 with bearings, not shown, are rotatably mounted on the stub shafts 47 and portions of the endless chains 18 extended downwardly from the sprockets 42 to the idler sprockets 49 and are passed around the bottoms of these sprockets. The chains 18 then extend upwardly and are passed over the tops of another pair of sprockets 50 to form a fourth crest 51 in the upper reach of the conveyor C. The sprockets 50 are mounted on a cross shaft 52 that in turn is rotatably carried by bearings 53 which are attached to the undersurface of the side angle irons 1. The axis of the cross shaft 52 lies in the same common plane that includes the axes of the cross shafts 28, 34 and 44. Also the common axis for the stub shafts 47 lies in the same common plane that includes the common axes for the pairs of stub shafts 24, 31 and 39. The portions of the chains 18 extending downwardly from the pair of sprockets 42, under the pair of idler sprockets 49 and up to the next pair of sprockets 50, forms the portion of the upper reach of the conveyor C represented by these chain portions, into a valley 54 that will be associated with the third hop picking stage F.

FIGURE 5 shows the sprockets 50 on a larger scale. It will also be seen from this figure and from FIGURE 2 that a cross shaft 55 is positioned to the right of and below the cross shaft 52. The shaft 55 is rotatably carried by bearings 56 that in turn are carried by sub-frames 57 which are connected to the side angle irons 1 and to the depending pair of angle irons 14. Idler sprockets 58 are mounted on the cross shaft 55 and portions of the endless chains 18 extend downwardly from the sprockets 50 and are passed around the idler sprockets 58. The start of the lower reach of the endless conveyor C commences at the pair of idler sprockets 58. The lower reach of the endless conveyor C extends back to the left hand pair of sprockets 23 in FIGURE 2, and at these sprockets the lower reach changes into the start of the upper reach where the hop vines are placed on the loading area for the machine. The pair of chain portions 18 for the lower reach of the endless conveyor C, are supported by idler sprockets 59 that are mounted on stub shafts 60. Bearings 61 rotatably carry the stub shafts 60 and in turn are supported by brackets 62 that are connected to the pair of depending angle irons 11.

the upper frame K are placed on the inverted channels 83 so that they will lie in a vertical plane that intersects the common axis for the stub shafts 24 for the idler sprockets 26, see FIGURE 5. Angle brackets or shoes 107 are secured near to the lower ends of the front angle irons and these ride on top of and are supported by the inverted channels 83.

A lower baffle member 108, T-shaped in cross section, see FIGURE 5, has its ends lying inside of the inner flanges of the inverted channels 83, see FIGURE 6, and these ends are welded to the bottoms of the front pair of angle irons 100. The baffle member 108 acts as the first barrier for the hop vines being carried by the upper reach of the endless conveyor C. A baffle plate 109, extends across the front of the frame K, and is welded or otherwise secured to the front pair of angle irons 100 and to the lower baffle member 108. This baffle plate 109 acts as a barrier and cooperates with the baffle member 108 for causing all hop vines to move under the member 108. The baffle plate 109 is not shown in FIGURE 6, so that the interior of the frame K, can be seen.

The portion of the upper reach C that passes beyond the pair of idler sprockets 23 disposed immediately in front of the baffle plate 109 extends downwardly toward the pair of idler sprockets 26 carried by the left hand pair of depending angle irons 11 shown in FIGURE 2. The portion of the upper reach C then extends upwardly from the idler sprockets 26 and passes over the pair of sprockets 27 to complete the formation of a valley in the upper reach that is positioned directly below the baffle member 108. The upper reach as its passes over the sprockets 27 forms the first crest 36.

The next pair of depending angle irons 101 that depend from the longitudinally extending side angle irons 99 of the vine retarding frame K carry a second baffle member 110 that has its ends welded to the bottoms of the angle irons 101. The baffle member 110 is positioned above the second valley 38 in the upper reach of the endless conveyor C, this valley lying between the crests 36 and 37 formed in the upper reach by the pairs of sprockets 27 and 33.

In like manner the pair of depending angle irons 102 that extend downwardly from the top angle irons 99 of the hop vine retarding frame K, support a third lower baffle member 111. This third baffle member is positioned between the second crest 37 and the third crest 43. The pair of angle irons 103 have a fourth baffle member 112 secured to their lower ends and the next pair of depending angle irons 104 supports a fifth baffle member 113 at their lower ends. Two more baffle members 114 and 115 are disposed at the lower ends of the pairs of depending angle irons 105 and 106 respectively. The distance between the pairs of depending angle irons 101 through 106 inclusive is such as to dispose the baffle members 110 through 115 in the valleys provided between the crests 36, 37, 43 and 51 in the upper reach of the conveyor C and between the crests 67, 72 and 78 on the upper reach of the second endless conveyor C1. The pair of depending angle irons 103 may have angle brackets or shoes 116 that ride on the inverted channels 83 and aid in adjustably supporting the hop vine retarding frame K. Also the pair of depending angle irons 106 are provided with angle brackets 117 or shoes that ride on the inverted channels 83. The depending pairs of angle irons 110 to 106 inclusive may have longitudinal extending metal bars, not shown, that parallel the top angle irons 99. These bars are not shown because of the small scale of the drawing in FIGURE 2 and the fact that the showing of the bars would complicate the clear illustration of other parts of the machine that are necessary to give a clear presentation of the essential parts of the machine that are needed for the construction and operation of the device. The sides of the vine-retarding frame K may have side panels for enclosing the mechanism carried by the frame. The side panels may extend the full length of the frame K or they may be a succession of smaller panels that extend between adjacent pairs of the depending angle irons 100 to 106 inclusive.

In FIGURE 3, we show an enlarged horizontal view of the portion of the machine shown in FIGURE 2 that includes one of the depending angle irons 106 and the shoe 117 that is supported on the top of the inverted channel 83. FIGURE 3 is a horizontal section taken along the line 3—3 of FIGURE 2 and only shows one of the depending angle irons 106 because the other angle iron of this pair would be of identical construction. A portion of the top horizontal angle iron 99 is shown by the dot-dash line in FIGURE 3.

We provide novel and simple means for moving the vine-retarding frame K as a unit with respect to the main frame that carries the endless conveyors C and C1 so that the operator may position the lower baffles 108 and 110 to 115 inclusive in proper relation with respect to the valleys formed between the crests in the two endless conveyors C and C1. The side angle irons 1 of the main frame carry an angle bracket 118, see FIGURES 2 and 3, and the angle bracket in turn supports a second angle bracket 119. A bolt 120 extends through an opening in the angle bracket 119 and has its other end welded or otherwise secured at 121 to the shoe 117. The end of the bolt 120 that extends beyond the angle bracket 119 is threaded and receives a nut 122.

FIGURE 1 shows the vine-retarding frame K on an incline of 30° from the horizontal and therefore the frame will have a tendency to move downwardly along the inverted channels 83 on which the supporting shoes 107, 116 and 117 ride. The operator can move the frame K along the inverted channels 83 by merely rotating the nuts 122 on the bolts 120 in the desired direction. There are two bolts 120, one for each side of the frame K.

Before describing the retarding mechanism which is mounted in the frame K it is best to set forth that the pairs of depending angle irons 101 to 106 inclusive form the six hop picking stages shown by the bracketed portions in FIGURE 2 from D through H inclusive and J. Each stage is separated from the adjacent stage by a baffle partition of the shape shown in FIGURE 5. The left hand baffle partition or plate 123 in this figure has a top wall 123a that extends to the right from the cross angle iron 124, the ends of this angle iron being secured to the longitudinally extending top angle irons 99. The cross angle iron 124 supports an inner and transversely extending frame 125 that is composed of depending side angle irons 125a and a cross member 126 which is T-shaped in cross section. The cross member 126 is used for cleaning hop vines from the vine retarding combs which will be described hereinafter.

The left hand baffle 123 has a top flange 123b that is integral with the top wall 123a and this flange is welded or otherwise secured to the cross angle iron 124 and also to the upper portion of the inner transverse frame 125. The left hand baffle or partition 123 also has an inclined wall 123c that extends downwardly from the top wall 123a and has a flange 123d at its lower end and this flange is welded or otherwise secured to the baffle member 110.

There is a baffle or a partition similar to the baffle 123 for each of the pairs of angle irons 102 to 106 inclusive. Since each of these baffles is identical to the baffle 123 that has already been described, further description of the additional baffles need not be given and corresponding parts of each baffle will be given like reference numerals. The purpose of the baffles or partitions is to prevent any passage of hop vines from one crest to the next crest on the upper reaches of the endless conveyors C and C1 without the hop vines first having to move under the lower baffle bars 110 to 115 inclusive and thus to be forced into the valleys that are disposed between adjacent crests. The top of the frame K is not covered and therefore the hop vines will not be compressed into a smaller space as they move over the succession of crests that extend throughout the length of the frame K.

We will now describe the means for temporarily holding certain hop vines as they move from one crest and then down into the adjacent valley and up onto the next crest. In FIGURES 2, 4 and 5, we show a hop vine retaining comb associated with each of the six hop picking stages indicated by the bracketed portions D through H inclusive and J. For example, the left hand end of the frame K shown in these figures has a comb indicated generally at L. This comb comprises two side arms 127 that are pivoted in bearings 128, these bearings in turn being secured to the undersides of the top angle irons 99. The free ends of the arms 127 are connected to a cross member 129 that is T-shaped in cross section. FIGURE 6 shows this cross member as having a plurality of teeth 130 welded thereto and extending downwardly toward the crest 36 on the upper reach of the endless conveyor C. The comb L is shown in its raised position in FIGURES 2 and 5 and when the comb is in this position the lower ends of the teeth 130 will be positioned adjacent to the cross member 126 that acts as a hop vine remover for any vines that might tend to adhere to the teeth of the comb as the latter is moved into raised position.

FIGURES 4 and 5 show the cross member 129 for the comb L as having a central bracket 131. A pair of links 132 have their lower ends pivotally connected to the central bracket 131 and have their upper ends connected to a center arm 133 that has its opposite end keyed to a shaft 134 that extends from the center of the frame K to the far side of the frame shown in FIGURE 4. The inner end of the shaft 134 is supported by a center bearing 135 that in turn is connected to the cross angle iron 124. The outer end of the shaft 134 is mounted in another bearing 136 that in turn is secured to the underside of the adjacent top angle iron 99.

FIGURES 4, 5 and 6 show the shaft 134 projecting beyond the side of the upper frame K and being provided with an outer arm 137. FIGURES 6 and 8 show this outer arm 137 with its free end pivotally connected to a pair of links 138. The links 138 have their other ends pivotally connected to another arm 139, see the far side of the frame K shown in FIGURE 4, and this arm is connected to a shaft 140 that is similar to the shaft 137 and is connected to a third comb M of the same construction as the comb L. Like parts for the comb M will be given the same reference numerals for similar parts in the comb L. A detailed description of the comb M is therefore not necessary.

The pair of links 138 shown in the far side of the frame K in FIGURE 4 are not only connected to the arm 139 that actuates the comb M but they are also connected to another pair of links 141 that have their free ends connected to another arm 142. This arm is mounted on a shaft 143 that is similar to the shafts 134 and 140 and is operatively connected to the fifth comb N. This fifth comb is constructed in all respects the same as the combs L and M and like reference numerals will be given to similar parts. The pair of links 141 are not only connected to the arm 142 but they are also connected to another pair of links 144 that extend to an arm 145, see FIGURE 5 that is keyed to a stub shaft 146. The stub shaft 146 also has a cam 147 rigidly secured thereto, see FIGURE 5.

Before describing how the cam 147 is periodically operated, we will first describe the other three combs that are operated in unison and independently of the operation of the combs L, M and N. Referring to FIGURES 4 and 5, we mount a comb P in the second hop picking stage E. This hop picking stage is composed of a portion of the crest 37, the valley 46 that lies adjacent to the crest and a portion of the crest 43. The comb P is identically of the same construction as the comb L that has already been described in detail. Corresponding parts of the two combs will be given like reference numerals.

FIGURE 5 shows the T-shaped cross member 129 for the comb P provided with a central bracket 148. A pair of links 149 are pivotally secured to the central bracket 148 and these links have their other ends pivotally secured to an arm 150. FIGURE 4 shows the arm 150 rigidly secured to a shaft 151 and this shaft extends from the center of the vine retarding frame K toward the near side top angle iron 99. A central bearing 152 is provided for the inner end of the shaft 151 and FIGURE 5 shows this bearing as being secured to a cross angle iron 153. The ends of the cross angle iron 153 are secured to the top angle irons 99.

The outer end of the shaft 151 is supported by a second bearing 154 and this second bearing is secured to the underside of the adjacent angle iron 99. FIGURE 2 shows the bearing 154 and both FIGURES 4 and 8 illustrate the shaft 151 as projecting beyond the side of the vine retarding frame K and as being provided with an arm 155 that is rigidly secured to the shaft. A pair of links 156 are pivotally secured to the free end of the arm 155 and these links have their other ends pivotally secured to another arm 157. This arm 157 is associated with the mechanism for raising and lowering another comb Q which is in reality the fourth comb in the row of combs shown in FIGURE 2 when counting from the left of the figure. The comb Q is associated with the hop picking stage indicated by the bracket G and this is the fourth hop picking stage. The arm 157 is operatively connected to the comb Q by a similar mechanism to that which connects the arm 155 to the comb P. Therefore no further description need be given for the operative elements interposed between the arm 157 and the comb Q.

It will further be seen from FIGURES 2 and 4 that a pair of links 158 have their ends connected to the arm 157 and have their other ends pivotally connected to another arm 159. The arm 159 is connected to a shaft that is similar to the shaft 151 and this shaft is operatively connected to another comb indicated generally at R. The comb R is identical to the comb P and therefore similar parts will be given like reference numerals. The comb R is associated with the sixth hop picking stage which is indicated by the bracket J in FIGURE 2.

A pair of links 160 are pivotally secured to the arm 159 and have their other ends pivotally secured to an arm 161. The arm 161 is connected to a cam 162 that is similar to the cam 147. The cam 162 rotates on a stub shaft 163 and this shaft is carried by a bearing 164 that in turn is secured to the underside of the adjacent angle iron 99. The axis of the stub shaft 163 coincides with the axis of the stub shaft 146.

FIGURE 5 shows the cam 147 in two positions. We provide common means for alternately actuating the cams for moving them from thier lowermost position shown by the dot-dash line in FIGURE 5 into their raised position shown by the full lines in the same figure. The combs L, M and N are shown in raised position in FIGURE 2 and this is caused by the cam 147 being swung into its raised position. The combs P, Q and R in FIGURE 2 are shown in the lowered or operative position and this is caused by the cam 162 being in its lower position. In FIGURES 2 and 4, we show a transversely extending shaft 165 and this shaft has an arm 166 disposed at the near end of the shaft when looking at FIGURE 4. A second arm 167 is disposed at the far end of the shaft when looking at the same figure. The shaft 165 is rotated by a means hereinafter described and will rotate the arms 166 and 167, these arms extending in diametrically opposite directions. The arm 166, see FIGURE 2, carries a cam roller 168 that is designated to contact with the cam 162 for each revolution of the arm and to swing the cam upwardly and in a counter-clockwise direction about the stub shaft 163. The upward swinging of the cam 162 will swing the arm 161 counter-clockwise and this arm will move the pairs of links 156, 158 and 160 on the near side of the machine when looking at FIGURE 4 and this movement will be to the right. The movement of the pairs of links to the right will rock the arms 155, 157 and 159 in a counter-clockwise direction and will cause the combs P, Q and R which are associated with these arms, to be lifted into their raised positions. Any hop vines retained by these combs while they were in their lowered positions will be freed.

After the arm 166 with its cam roller 168 has raised and lowered the cam 162, the other arm 167 disposed at the opposite end of the shaft 164 will have its cam roller 169 contact with the cam 147 disposed on the far side of the machine when looking at FIGURE 4. The cam roller will swing the cam 147 in a counter-clockwise direction about the stub shaft 146. The rotating cam will swing its arm 145 and will move the pairs of links 138, 141 and 144 disposed on the far side of the machine when looking at FIGURE 4. This movement will be to the right and the links will rock the arms 137, 139 and 142 counter-clockwise and cause the combs L, M and N, associated with these arms, to be moved into the raised positions shown in FIGURES 2 and 5.

Since the arms 166 and 167 that carry the cam rollers 168 and 169 are disposed 180° apart, one set of combs L, M and N will be in raised position while the other set of combs P, Q and R will be in lowered or operative position. When the combs are in their lowered position the teeth 130 will have their lower ends disposed a slight distance above the tops of the crests 36, 37, 43, 51, 67, 72 and 78.

It is best now to described how the various parts of the machine are operated. In FIGURE 1, we show a motor 170. This motor has a drive pulley 171 and an endless belt 172 extends around the drive pulley and is also passed around another pulley 173 that is mounted on the shaft 80. It has already been explained how the shaft 80 carries sprockets 77 and the endless conveyor chains 18′ are passed over these sprockets and are actuated when these sprockets are rotated. The sprockets 77 are shown in FIGURES 2 and 5.

The actuation of the endless conveyor C1 by the driving sprockets 77 will cause the sprocket 63, see FIGURE 2, to be rotated. FIGURE 5 shows the sprocket 63 mounted on the shaft 64 and this shaft will be rotated by the sprockets. Referring back to FIGURE 1, and to FIGURE 9, it will be seen that we have mounted a sprocket 174 on the outer end of the shaft 64 and we have mounted another sprocket 175 on the outer end of the shaft 52. An endless sprocket chain 176 interconnects the pair of sprockets 174 and 175 and therefore a rotation of the shaft 64 will rotate the shaft 52. FIGURE 5 shows the shaft 52 carrying the sprockets 50 and the endless chains 18 for the conveyor C are passed over these sprockets and in this way movement is imparted to the conveyor C.

In FIGURE 1, the cross shaft 73 is shown as being provided with a pulley 177 on its outer end. Another pulley 178 is mounted on the transverse shaft 165 and an endless belt 179 connects these pulleys. The shaft 73 is rotated by the sprockets 71 and the rotation of the shaft will rotate the transverse shaft 165 by the pulley and belt mechanism just described. This will cause the two sets of combs in the vine-retarding frame K to be actuated.

In FIGURE 1, we show a hop vine feeder indicated generally at S. This feeder comprises a frame 180 that is supported by the main side angle irons 1. An endless conveyor 181 extends around drums 182 and 183 that in turn are carried by the frame 180. The endless conveyor 181 is similar in structure to the endless conveyors C and C1 and it has a plurality of rows of fingers 184 mounted thereon. The endless conveyor 181 has its upper reach moving in the direction of the arrow 185. The left hand shaft 22 for the sprocket 23 shown in FIGURE 2 has a sprocket and chain drive connection 186 with the drum 183. The hop vine feeder S will therefore be operated when the machine is operated. The vines are placed on the conveyor B and the feeder S will have its fingers 184 remove the vines from the conveyor B and carry them onto the loading area of the endless conveyor C.

Operation

We have already explained how the various parts of the machine are operated by the single motor 170. We have also set forth how the feeding conveyor S will remove the hop vines from the conveyor B and deposit them on the loading area of the endless conveyor C.

The drawings show the combs L, M and N in FIGURE 2 in raised position and the combs P, Q and R in lowered or operative position. The first group of combs L, M and N are all operatively connected together by the pairs of links 138, 141 and 144 shown in FIGURES 4, 5 and 8. The cam 147 operates this group of combs and it is shown in raised position in FIGURES 5 and 8.

The second group of combs P, Q and R are operatively connected together by the pairs of links 156, 168 and 160. The cam 162 operates this second group of combs. This cam is shown in lowered position in FIGURE 2 and the combs P, Q and R are also shown in lowered position in the same figure.

The endless conveyor C will move the hop vines toward the front end of the vine retarding frame K and the baffle plate 109 will aid the conveyor in moving all of the vines into the valley that just preceeds the first crest 36. The vines must pass under the lower baffle 108, see FIGURE 5, before they can be carried over the crest 36. If the first comb L is in raised position as shown in FIGURE 5 when the vines pass over the crest 36, the comb will be prevented from retaining any of the hop vines. The hop vines will then be conveyed into the second valley 38 and will pass under a second lower baffle member 110. The transverse partition 123 will prevent any hop vines from passing over the top of the baffle 110.

The hop vines then will be carried over the second crest 37 of the endless conveyor C and certain of the hop vines will be held against further movement because the second comb P will be in its lowered position and the teeth 130 of this comb will engage with certain of the hop vines. The tendency of the hop vines in moving over the crest 37 of coming into engagement with the teeth 130 will be for these vines to loop themselves about the teeth with the ends of the vines continuing on down into the third valley 46 and up onto the next crest 43. The vines retained by the teeth 130 will be temporarily held against movement while the endless conveyor C is still moving. Therefore the hop picking fingers 20 on the portions of the conveyor C that extend along the crest 37 from the comb teeth and onward and then extend through the valley 46 and up onto the next crest 43, these hop picking fingers will engage with the temporarily held vines and will remove hops from these vines. The hops that are picked from vines will drop through the main frame A and drop upon the upper reach 2a of the endless conveyor 2. The screen mesh of this conveyor is preferably two inches square and the hops will drop through the upper and lower reaches 2a and 2b respectively and then drop onto the endless conveyor 5 where the upper reach 5a will convey the hops to the right hand end of the conveyor when looking at FIGURE 1. Any larger material removed from the hop vines by the fingers 20 will drop upon the upper reach 2a of the endless conveyor 2 and be carried to the right hand end of the conveyor.

While the hop vines in the second hop picking section E are being retained by the comb P, the other combs Q and R that are operatively connected with the comb P will also be in their lower positions. During the movement of the hop vines by the conveyor C, the transverse shaft 165 will also be rotating and the cam roller 168 carried by the arm 166 will be moved into contact with the cam 162 and will move this cam in a counterclockwise direction. This movement will cause the parallel links 156, 158 and 160 to raise the combs P, Q and R into inoperative position. FIGURE 5 shows the teeth 130 of the comb P positioned close to the transverse baffle 126 that is associated with the second hop picking section E. This baffle will wipe along the teeth 130 and will remove any hop vines that might have a tendency to cling to the teeth.

The shape of the cams 147 and 162 is such that they will be acted upon by their respective cam rollers 169 and 168 through approximately 120° of rotation of the shaft 164. This permits the combs to remain in their lowermost positions while the shaft rotates through 240°. Either the set of combs L, M and N will be in their lowered position or the set of combs P, Q and R will be in their lowered positions. The hop picking stages D through H and J will have time intervals when the combs associated with these stages will be raised into inoperative position and will permit the hop vines in the stage to move onto the next hop picking stage. FIGURES 1 and 5 show that the cams 147 and 162 are positively rotated counterclockwise by the arms 166 and 167 and their cam rollers 168 and 169. However the cams are free to swing clockwise on their return movements. This will permit the combs L, M, N, P, Q, and R to move downwardly by gravity and their tines 130 can penetrate the vines on the upper reaches of the two endless conveyors without being positively forced into the vines. There is less likelihood of any breakage of the combs and the jambing of the vines.

The hop vines will be carried over four crests 36, 37, 43 and 51 in the upper reach of the endless conveyor C and will be caused to move through three valleys that separate these four crests. The endless conveyor C1 has its first crest 67 separated from the last crest 51 in the endless conveyor C by a valley 113. There are three crests 67, 72, and 78 formed in the second conveyor C1 and these are separated by two valleys. As already stated, we do not wish to be confined to any exact number of crests and valleys nor to any exact number of endless conveyors.

We have found that when the hop vines are moved into a valley such as the valleys 38, 46, 54, 66, 75 and 82, they have a tendency to spread laterally and to contact with the inner faces of the idler sprockets 26, 30, 41, 49, 68 and 76. The rotation of the pairs of idler sprockets will tend to rotate the vines into a cylinder whose axis substantially coincides with the common axis of the stub shafts 24, 31, 39, 47, 69 and 79. The forming of the hop vines into a cylinder at the base of the valley will prevent other hop vines from passing through this valley and continuing in their movement along the length of the machine. It is then necessary to stop the machine and remove the hop vines that have formed themselves into the cylinder. To overcome this we have provided the shields or guards 84 that have depending portions 85 that extend downwardly on the inner surfaces of the pairs of idler sprockets 26, 30, 44, 49, 68 and 76 to at least one-half the area of these surfaces. These depending portions of the shields will prevent the vines that are passing through the valleys from contacting with the upper halves of the inner surfaces of the idler sprockets. We have found that this is sufficient to prevent the hop vines that enter the valleys from being rolled into cylinders that remain in these valleys.

In FIGURE 1, we show a vine deflector 187 that is curved in the manner shown and is secured to the uprights 10 at the point 188 and is also secured to a transverse member 189 that in turn has its ends connected to the uprights 10. The hop vines after passing over the last crest 78, see FIGURE 2, will move against the vine deflector 187 and be guided downwardly to drop upon the upper reach 2a of the conveyor B. This conveyor will discharge the vines that have been picked of hops and will deliver them at the right hand end of the conveyor when looking at FIGURE 1.

We claim:
1. In a hop picking machine:
  (a) a combined picker and endless conveyor including hop picking fingers on the conveyor;
  (b) a plurality of pairs of sprockets lying in the same plane and supporting the upper reach of the conveyor, each pair being spaced from adjacent pairs;
  (c) a pair of idler sprockets positioned in each space provided between the pairs of the first mentioned sprockets and being placed below the plane thereof, the conveyor having its upper reach being alternately passed over the upper pairs of sprockets and under the lower pairs to form a plurality of crests and valleys in the upper reach;
  (d) a vine-retarding comb positioned at each valley and providing a series of combs, each being adapted to be moved from vine retarding position with respect to the upper reach and be raised into a vine-releasing position;
  (e) a first means operatively connecting every other comb into a first group for causing the combs in this group to be moved in unison from vine-retarding positions into vine releasing positions and vice versa;
  (f) a second means operatively connecting the remaining combs into a second group for causing the combs in this second group to be moved in unison from vine releasing positions into vine retarding positions and vice versa; and
  (g) common means for alternately operating said first and said second means in sequence so that one group of combs will be in vine retarding position in alternate valleys before the other group of combs will be raised into inoperative position.

2. The combination as set forth in claim 1: and in which
  (a) a comb cleaning member is associated with each comb;
  (b) said combs when being raised into vine-releasing positions, moving past said comb cleaning members;
  (c) whereby the combs are freed of all vines as they are moved into vine-releasing positions.

3. The combination as set forth in claim 1: and in which
  (a) a separate frame carries all of the vine-retarding combs; and
  (b) adjustable means for moving said frame with respect to the valleys in the upper reach of said conveyor for properly positioning all of said combs in the desired positions with respect to said valleys and the crests on both sides of the valleys for obtaining the best hop picking action by the fingers on the vines that are temporarily held by said combs.

4. The combination as set forth in claim 3: and in which
  (a) said separate frame has a baffle disposed near to the first comb in the series of combs;
  (b) the upper reach of said conveyor being provided with a first valley in addition to the series of valleys that have combs associated therewith and being provided with a first crest that lies between said first valley and said first comb in the series; and
  (c) said baffle being positioned with respect to said first valley for causing all of the vines being carried by the upper reach of said conveyor to move under said baffle and through said first valley, the vines then being carried over said first crest and being opened up so that said fingers on said conveyor can move readily and pick hops from those vines that are temporarily held by said first comb.

5. In a hop picking machine:
(a) a combined picker and endless conveyor having an upper reach and including hop picking fingers on the conveyor;
(b) means for causing a portion of the upper reach of the conveyor to move over a first crest and then into a valley and up onto a second crest;
(c) a vine-retarding comb mounted above the valley portion in said conveyor; and
(d) means for periodically moving said comb downwardly toward said first crest at a place in advance of the valley for holding certain hop vines carried by and moving with the conveyor over the first crest, the vines thus held extending into and through the valley and up onto the second crest;
(e) the fingers on the conveyor removing hops from the held vines, the picking action extending from a portion of the first crest, through the valley and up onto the second crest;
(f) said means raising said comb after a predetermined time interval to permit said conveyor to freely move vines from the first crest, through the valley and over the second crest.

6. The combination as set forth in claim 5: and in which
(a) a comb cleaning member is associated with said comb and so placed that as the comb is raised from its vine-retarding position, it will be wiped by said cleaning member for removing any vines tending to remain attached to said comb.

7. The combination as set forth in claim 5: and in which
(a) a baffle extends parallel with the length of the valley and has its lower end extending partly into the valley for causing all of the vines being carried by said conveyor to pass into the valley before the vines can move from the first crest to the second crest.

8. In combination:
(a) an endless conveyor for moving hop vine parts and having an upper reach;
(b) hop picking fingers carried by said conveyor;
(c) means supporting the upper reach and guiding it along a path defining a plurality of spaced-apart valleys therein;
(d) a baffle positioned at each valley for causing the vine parts to move into each valley as they are carried from crest to crest;
(e) a comb for each valley;
(f) means operatively connecting alternate combs into a first group;
(g) means operatively connecting the other combs into a second group;
(h) means for moving the conveyor to advance the hop vine parts under the combs; and
(i) means for alternatetly operating said first and second groups of combs so that one group or the other will be in operative position for retarding hop vine parts at all times.

9. In combination:
(a) an endless conveyor for moving hop vine parts and having an upper reach;
(b) hop picking fingers carried by the conveyor;
(c) means supporting the upper reach and guiding it along a path defining a plurality of spaced-apart valleys, the portions of the upper reach lying between adjacent valleys being formed into crests;
(d) a single pivoted comb associated with each valley an extending transversely across said conveyor alternate combs being operatively connected together to form one group and the remaining combs being operatively connected together to form a second group;
(e) means for swinging said groups of combs alternately toward and away from said conveyor so that the combs of one group are moved into their respective valleys at one time while the combs of the other group are raised out of their valleys;
(f) means for advancing said conveyor under said combs;
(g) either group of combs when moved toward the conveyor engaging with certain hop vine parts for retarding their movement relative to said conveyor for permitting the picking of hops by said fingers on the retarded vine parts;
(h) the same group of combs when moved away from said conveyor releasing all of the hop vine parts in the valleys associated with the combs and permitting them to again freely move with the conveyor.

10. In combination:
(a) a pair of endless conveyors having their upper reaches arranged in tandem; both of said upper reaches having crests and valleys formed therein, the adjacent portions of the upper reaches of both of said conveyors forming an interconnecting valley disposed between said conveyors;
(b) hop picking fingers carried by said conveyors;
(c) pivoted combs positioned above the valleys in the upper reaches of said conveyors and extending across the widths of said conveyors one of said pivoted combs being associated with said interconnecting valley;
(d) means for advancing the upper reaches in both of said conveyors under said combs; and
(e) means for moving said combs alternately toward and away from said conveyors for moving the combs into engagement with the hop vine parts so as to intermittently retard the movement of these hop vine parts relative to said conveyors for permitting the picking of hops by the fingers of both conveyors on the hop vine parts thus held.

11. In a hop picking machine;
(a) a combined picker and endless conveyor including hop picking fingers on the conveyor;
(b) a plurality of pairs of sprockets lying in the same plane and supporting the upper reach of the conveyor, each pair being spaced from adjacent pairs;
(c) a pair of idler sprockets positioned in each space provided between the pairs of the first mentioned sprockets and being placed below the plane thereof, the conveyor having its upper reach being alternately passed over the upper pairs of sprockets and under the lower pairs to form a plurality of crests and valleys in the upper reach; and
(d) shields mounted on said machine and positioned intermediate the inner surfaces of said idler sprockets and the lateral edges of said upper reach of said conveyor for preventing hop vine parts that move into said valleys from contacting with said inner surfaces;
(e) whereby said shields will prevent the inner surfaces of said idler sprockets from contacting with the hop vine parts and rolling them into a cylindrical shape.

12. In combination:
(a) an endless conveyor for moving hop vine parts and having an upper reach;
(b) hop picking fingers carried by the conveyor;
(c) means supporting the upper reach and guiding it along a path defining a plurality of spaced-apart valleys, the portions of the upper reach lying between adjacent valleys being formed into crests;
(d) a pivoted comb associated with each valley and extending transversely across said conveyor;
(e) means for swinging said combs alternately toward and away from said conveyor;
(f) means for advancing said conveyor under said combs;
(g) the combs when moved toward the conveyor engaging with certain hop vine parts for retarding their movement relative to said conveyor for permitting the picking of hops by fingers on the retarded vine parts;

(h) the combs when moved away from said conveyor releasing the hop vine parts and permitting them to again move with the conveyor;

(i) a second endless conveyor for moving hop vine parts carrying hop picking fingers and having an upper reach;

(j) means supporting the upper reach of said second conveyor and guiding it along a path defining a plurality of spaced apart valleys separated by crests;

(k) the upper reach of said second conveyor constituting an extension of the upper reach of said first-mentioned conveyor and being placed adjacent thereto;

(l) the adjacent portions of the upper reaches of both of said conveyors forming an interconnecting valley disposed between said conveyors;

(m) one of said pivoted combs being associated with said interconnecting valley and being actuated by said comb swinging means; the other pivoted combs being associated with the valleys formed in the upper reach of the second conveyor; and (n) means for advancing said second conveyor under the combs associated with the valleys provided in the upper reach of the second conveyor.

13. In a hop picking machine:
(a) a combined picker and endless conveyor having an upper reach and including hop picking fingers on the conveyor;
(b) means for causing a portion of the upper reach of the conveyor to move over a first crest and then into a valley and up onto a second crest;
(c) a frame having a vine-retarding comb operatively mounted therein, the comb being disposed above the valley portion in said conveyor; and
(d) means for periodically moving said comb downwardly toward said first crest at a place in advance of the valley for holding certain hop vines carried by and moving with the conveyor over the first crest, the vines thus held extending into and through the valley and up onto the second crest;
(e) the fingers on the conveyor removing hops from the held vines, the picking action extending from a portion of the first crest, through the valley and up onto the second crest;
(f) said means raising said comb after a predetermined time interval to permit said conveyor to freely move vines from the first crest, through the valley and over the second crest; and
(g) said frame is open on top to permit the unrestricted movement of the vines over the crest when said comb releases the vines.

14. The combination as set forth in claim 13: and in which
(a) adjustable means is provided for moving said frame with respect to the valley for properly positioning said comb in relation to the valley and the first crest for obtaining the best hop picking action by the fingers on the vines that are temporarily held by said comb.

15. In a hop picking machine:
(a) a combined picker and endless conveyor including hop picking fingers on the conveyor;
(b) means supporting the upper reach of the endless conveyor and guiding it along a path defining a plurality of spaced-apart valleys separated by crests;
(c) a comb for each valley and adapted to move into the valley by gravity for engaging with hop vines being carried through the valley by the moving conveyor;
(d) means operatively connecting alternate combs into a first group for alternately raising the combs in the group out of the valleys and then permitting them to move back into the valleys by gravity;
(e) means operatively connecting the other combs into a second group for alternately raising the combs in this group out of their valleys and then permitting them to move back into their valleys by gravity;
(f) means for moving the conveyor for advancing the hop vines under the combs; and
(g) means for alternately operating said first and second groups of combs for raising them out of their associate valleys for a predetermined time period and then freeing them from the operating means so that the freed group of combs will move into their associate valleys by gravity, the combs of both groups having tines that will penetrate the vines moving therebeneath and hold these vines for permitting the fingers on the moving conveyor to remove hops therefrom.

16. The combination as set forth in claim 15: and in which
(a) a baffle extends partly into each valley for causing all of the vines being carried by said conveyor to pass into the valleys where they will be periodically engaged by the combs associated with the valleys.

References Cited by the Examiner

UNITED STATES PATENTS 2,681,066   6/1954   Dauenhauer _____ 130—30

ABRAHAM G. STONE, *Primary Examiner.*

ANTONIO F. GUIDA, *Examiner.*